US009767978B1

(12) United States Patent
Brandt et al.

(10) Patent No.: US 9,767,978 B1
(45) Date of Patent: Sep. 19, 2017

(54) MEDIUM VOLTAGE BREAKER CONDUCTOR WITH AN ELECTRICALLY EFFICIENT CONTOUR

(71) Applicant: Eaton Corporation, Cleveland, OH (US)

(72) Inventors: Douglas Michael Brandt, Wampum, PA (US); Brad Robert Leccia, Bethel Park, PA (US); Richard Blaine Frye, IV, Aliquippa, PA (US); Zachary Ryan Jenkins, Pittsburgh, PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 15/156,409

(22) Filed: May 17, 2016

(51) Int. Cl.
*H01H 71/02* (2006.01)
*H01H 71/08* (2006.01)

(52) U.S. Cl.
CPC ... *H01H 71/0235* (2013.01); *H01H 2071/086* (2013.01); *H01H 2205/002* (2013.01); *H01H 2223/008* (2013.01); *H01H 2239/044* (2013.01); *H01H 2239/072* (2013.01)

(58) Field of Classification Search
CPC .......... H01H 71/0235; H01H 33/6606; H01H 2033/6613; H01H 2071/086; H01H 2223/008; H01H 2239/044; H05K 5/0217; H02B 11/04

USPC ................................. 218/118, 134, 152–154
See application file for complete search history.

(56) References Cited

U.S. PATENT DOCUMENTS

| | | | | |
|---|---|---|---|---|
| 3,829,647 A * | 8/1974 | Cleaveland | ............ | H01B 7/426 200/289 |
| 3,973,096 A * | 8/1976 | Burgoon | .................. | H01H 9/52 200/289 |
| 4,005,297 A * | 1/1977 | Cleaveland | ............. | F28D 15/02 165/104.26 |
| 8,278,582 B2 * | 10/2012 | Tu | ............................ | H01H 9/52 218/118 |
| 2009/0255905 A1 * | 10/2009 | Lee | .................... | H01H 33/6606 218/139 |
| 2015/0139275 A1 * | 5/2015 | Park | ....................... | G01K 13/00 374/152 |

\* cited by examiner

*Primary Examiner* — Renee Luebke
*Assistant Examiner* — William Bolton
(74) *Attorney, Agent, or Firm* — Eckert Seamans; David Jenkins; Grant Coffield (57) ABSTRACT

The present disclosure provides a conductive member for a circuit breaker high voltage portion conductor assembly, the conductive member including a body with a transfer portion and a coupling portion. The body transfer portion has an electro-thermally efficient contour. That is, the body transfer portion has an electrically efficient contour and a thermally efficient contour. The body transfer portion includes a number of slots defining fins. In this configuration, the body transfer portion distributes current generally evenly across a cross-sectional area of the conductive member body. Further, the fins provide heat dissipation via convection.

8 Claims, 13 Drawing Sheets

MEDIUM VOLTAGE BREAKER CONDUCTOR WITH AN ELECTRICALLY EFFICIENT CONTOUR

BACKGROUND OF THE INVENTION

Field of the Invention

The disclosed and claimed concept relates to a vacuum circuit breaker and, more specifically, to a vacuum circuit breaker including a conductive member with an electro-thermally efficient contour.

Background Information

Circuit breakers and other such devices provide protection for electrical systems from electrical fault conditions such as current overloads, short circuits, and low level voltage conditions. In one embodiment, circuit breakers include a spring-powered operating mechanism which opens electrical contacts to interrupt the current through the conductors in an electrical system in response to abnormal conditions. In particular, vacuum circuit interrupters include separable main contacts disposed within an insulated and hermetically sealed vacuum chamber within a housing.

The contacts are part of an electrode including a stem and a contact member. Generally, one of the electrodes is fixed relative to the housing. The other electrode is moveable relative to the housing and the other electrode. An operating mechanism is structured to move the movable contact between a first configuration, wherein the movable contact is spaced from, and is not in electrical communication with, the fixed contact and a second configuration, wherein the movable contact is directly coupled to, and is in electrical communication with, the fixed contact. In this configuration, a vacuum interrupter is structured to interrupt medium voltage alternating current (AC) and, also, high voltage AC currents of several thousands of amperes or more. In one embodiment, one vacuum interrupter is provided for each phase of a multi-phase circuit and the vacuum interrupters for the several phases are actuated simultaneously by a common operating mechanism, or separately or independently by separate operating mechanisms. The electrodes can commonly take three positions: closed, opened and grounded.

The electrodes are also part of a larger conductor assembly that includes a first terminal, a primary first conductor, a primary second conductor and a second terminal. The first terminal is structured to be coupled to, and in electrical communication with, either a line or a load. The first terminal is coupled to, and in electrical communication with, the primary first conductor. The primary first conductor is coupled to, and in electrical communication with, the fixed electrode. The second terminal is structured to be coupled to, and in electrical communication with, the other of either a line or a load. The second terminal is coupled to, and in electrical communication with, the primary second conductor. The primary second conductor is coupled to, and in electrical communication with, the movable electrode.

The first and second primary conductors are generally made from either generally cylindrical copper members or a number of generally planar copper members. In some instances planar copper members are bent. Further, in some instances, multiple planar copper members are disposed in a stack. Such conductors have several disadvantages.

For example, such conductors are subjected to a "skin effect." As used herein, a "skin effect" is the tendency of an alternating electric current to become distributed within a conductor such that the current density is largest near the surface of the conductor, and decreases with greater depths in the conductor. That is, the "skin effect" tends to push the current towards the outer surface of a conductor, therefore the inner portions of the conductor have a lower current density than the outer portions. Stated alternately, such primary conductors do not have an electrically efficient contour. Further, such primary conductors generate heat as current passes therethrough. The disclosed contours are not adapted to dissipate heat. Stated alternately, such primary conductors do not have a thermally efficient contour.

Further, with regard to primary conductors made from planar members, the planar members tend to have sharp edges. Such sharp edges contribute to the formation of arcs between elements. Also, primary conductors made from copper contribute to all the problems stated above.

There is, therefore, a need for a conductive member that is not subject to the disadvantages identified above. Further, there is a need for a conductive member that is usable in existing circuit breakers.

SUMMARY OF THE INVENTION

These needs, and others, are met by at least one embodiment of the disclosed and claimed concept which provides a conductive member for a circuit breaker high voltage portion conductor assembly, the conductive member including a body with a transfer portion and a coupling portion. The body transfer portion has an electro-thermally efficient contour. That is, the body transfer portion has an electrically efficient contour and a thermally efficient contour. In an exemplary embodiment, the body transfer portion includes a number of slots defining fins. In this configuration, the body transfer portion distributes current generally evenly across a cross-sectional area of the conductive member body. Further, the fins provide heat dissipation via convection.

Further, the conductive member body does not have any sharp edges or corners. Further, the conductive member body is, in an exemplary embodiment, made from aluminum. In this configuration, the conductive member body solves the problems stated above. That is, the slots/fins, the lack of sharp edges or corners, or the aluminum body, or any combination of these elements, solve the problems stated above.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

It will be appreciated that the specific elements illustrated in the figures herein and described in the following specification are simply exemplary embodiments of the disclosed concept, which are provided as non-limiting examples solely for the purpose of illustration. Therefore, specific dimensions, orientations, assembly, number of components used, embodiment configurations and other physical characteristics related to the embodiments disclosed herein are not to be considered limiting on the scope of the disclosed concept.

Directional phrases used herein, such as, for example, clockwise, counterclockwise, left, right, top, bottom, upwards, downwards and derivatives thereof, relate to the orientation of the elements shown in the drawings and are not limiting upon the claims unless expressly recited therein.

As used herein, the singular form of "a," "an," and "the" include plural references unless the context clearly dictates otherwise.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies. As such, as used herein, "structured to [verb]" recites structure and not function. Further, as used herein, "structured to [verb]" means that the identified element or assembly is intended to, and is designed to, perform the identified verb. Thus, an element that is merely capable of performing the identified verb but which is not intended to, and is not designed to, perform the identified verb is not "structured to [verb]."

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, the phrase "removably coupled" means that one component is coupled with another component in an essentially temporary manner. That is, the two components are coupled in such a way that the joining or separation of the components is easy and would not damage the components. For example, two components secured to each other with a limited number of readily accessible fasteners, i.e., fasteners that are not difficult to access, are "removably coupled" whereas two components that are welded together or joined by difficult to access fasteners are not "removably coupled." A "difficult to access fastener" is one that requires the removal of one or more other components prior to accessing the fastener wherein the "other component" is not an access device such as, but not limited to, a door.

As used herein, "operatively coupled" means that a number of elements or assemblies, each of which is movable between a first position and a second position, or a first configuration and a second configuration, are coupled so that as the first element moves from one position/configuration to the other, the second element moves between positions/configurations as well. It is noted that a first element may be "operatively coupled" to another without the opposite being true.

As used herein, a "coupling assembly" includes two or more couplings or coupling components. The components of a coupling or coupling assembly are generally not part of the same element or other component. As such, the components of a "coupling assembly" may not be described at the same time in the following description.

As used herein, a "coupling" or "coupling component(s)" is one or more component(s) of a coupling assembly. That is, a coupling assembly includes at least two components that are structured to be coupled together. It is understood that the components of a coupling assembly are compatible with each other. For example, in a coupling assembly, if one coupling component is a snap socket, the other coupling component is a snap plug, or, if one coupling component is a bolt, then the other coupling component is a nut.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are to fit "snugly" together. In that situation, the difference between the size of the components is even smaller whereby the amount of friction increases. If the element defining the opening and/or the component inserted into the opening are made from a deformable or compressible material, the opening may even be slightly smaller than the component being inserted into the opening. With regard to surfaces, shapes, and lines, two, or more, "corresponding" surfaces, shapes, or lines have generally the same size, shape, and contours.

As used herein, the statement that two or more parts or components "engage" one another shall mean that the elements exert a force or bias against one another either directly or through one or more intermediate elements or components. Further, as used herein with regard to moving parts, a moving part may "engage" another element during the motion from one position to another and/or may "engage" another element once in the described position. Thus, it is understood that the statements, "when element A moves to element A first position, element A engages element B," and "when element A is in element A first position, element A engages element B" are equivalent statements and mean that element A either engages element B while moving to element A first position and/or element A either engages element B while in element A first position.

As used herein, "operatively engage" means "engage and move." That is, "operatively engage" when used in relation to a first component that is structured to move a movable or rotatable second component means that the first component applies a force sufficient to cause the second component to move. For example, a screwdriver may be placed into contact with a screw. When no force is applied to the screwdriver, the screwdriver is merely "coupled" to the screw. If an axial force is applied to the screwdriver, the screwdriver is pressed against the screw and "engages" the screw. However, when a rotational force is applied to the screwdriver, the screwdriver "operatively engages" the screw and causes the screw to rotate. Further, with electronic components, "operatively engage" means that one component controls another component by a control signal or current.

As used herein, the word "unitary" means a component that is created as a single piece or unit. That is, a component that includes pieces that are created separately and then coupled together as a unit is not a "unitary" component or body.

As used herein, the term "number" shall mean one or an integer greater than one (i.e., a plurality).

As used herein, "about" in a phrase such as "disposed about [an element, point or axis]" or "extend about [an element, point or axis]" or "[X] degrees about an [an element, point or axis]," means encircle, extend around, or measured around. When used in reference to a measurement or in a similar manner, "about" means "approximately."

As used herein, in the phrase "[x] moves between its first position and second position," or, "[y] is structured to move [x] between its first position and second position," "[x]" is the name of an element or assembly. Further, when [x] is an element or assembly that moves between a number of positions, the pronoun "its" means "[x]," i.e., the named element or assembly that precedes the pronoun "its."

Figure 1:
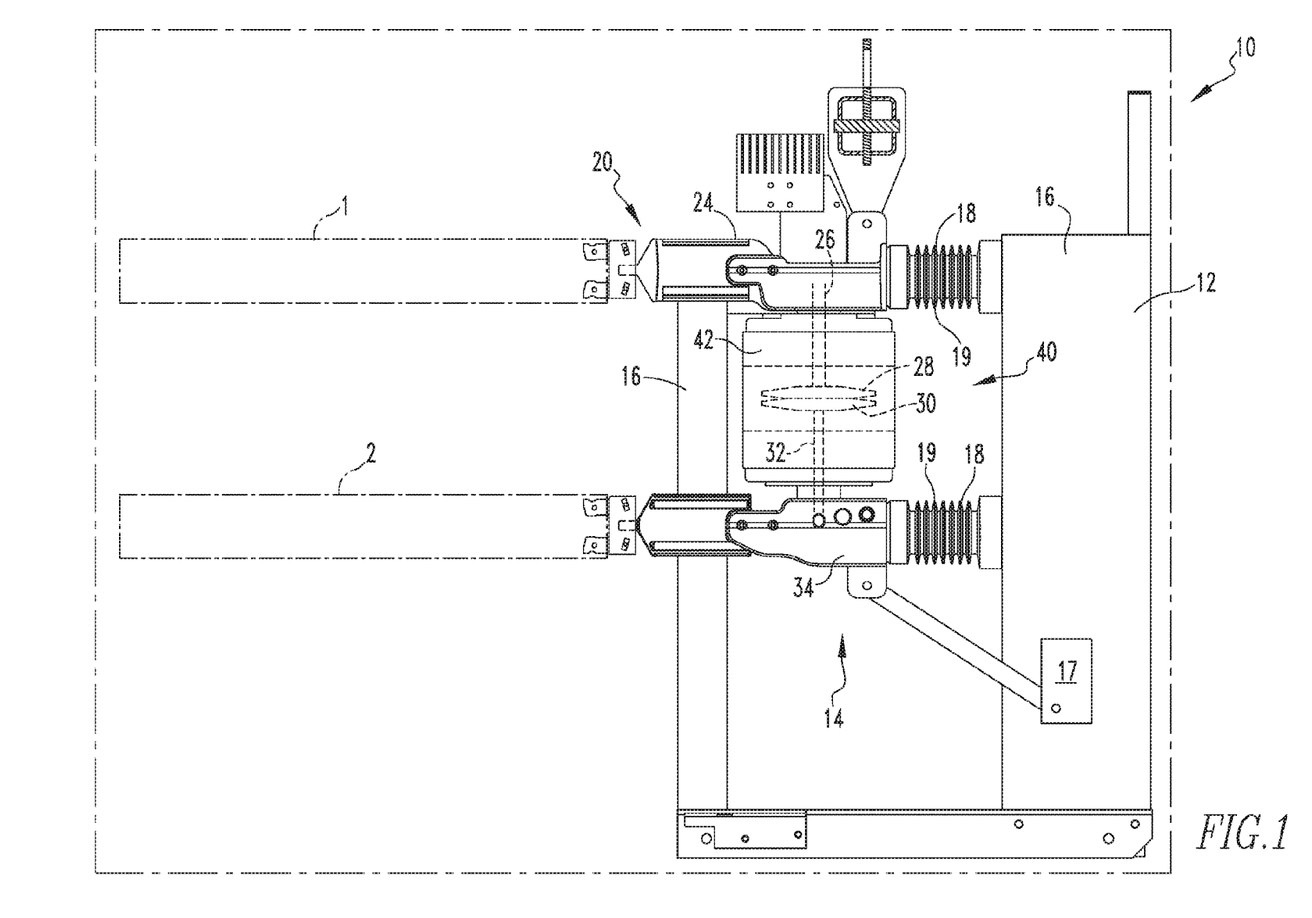
FIG. 1 is a side view of a vacuum circuit breaker.

Referring to FIG. 1, there is illustrated a vacuum circuit breaker 10 incorporating a vacuum interrupter assembly 40. As is known, the vacuum circuit breaker 10 may be a single pole or multi-pole vacuum circuit breaker 10. Hereinafter, and as an exemplary embodiment, only a single pole will be discussed. It is, however, understood that the claims are not limited to an embodiment having only a single pole. Generally, the vacuum circuit breaker 10, in an exemplary embodiment, includes a low voltage portion 12 and a high voltage portion 14. The low voltage portion 12 includes a housing 16 structured to include a control device (not shown) such as, but not limited to, a circuit breaker assembly and/or a control panel for manually operating the vacuum circuit breaker as well as an operating mechanism 17, shown schematically. The operating mechanism 17 is structured to change the state of the contacts 28, 30 (discussed below) to either an open or closed configuration. The control device is structured to actuate the operating mechanism 17. The low voltage portion 12 is coupled to the high voltage portion 14 via stand-off supports 18 which, in an exemplary embodiment, are insulated rods 19.

Generally, a line 1 is coupled to, and is in electrical communication with, the upper, first terminal 22 (discussed below) and a load is coupled to, and is in electrical communication with, the lower, second terminal 36 (discussed below). There are instances, however, such as when a line enters through a floor (not shown), wherein the line is coupled to, and is in electrical communication with, the lower, second terminal 36. Thus, it is understood that the location of the line/load depends upon the configuration of each vacuum circuit breaker 10. In the example shown, it is assumed that the line is coupled to, and is in electrical communication with, the upper, first terminal 22 and the load is coupled to, and is in electrical communication with, the lower, second terminal 36.

The high voltage portion 14 includes a conductor assembly 20 as well as other elements. Each pole of the conductor assembly 20 includes a line, first terminal 22, a primary first conductor 24, a first stem assembly 26, a first contact 28, a second contact 30, a second stem assembly 32, a primary second conductor 34 and a load, second terminal 36. The first stem assembly 26, first contact 28, second contact 30, and second stem assembly 32, as well as a vacuum housing 42, are also collectively identified as the vacuum interrupter assembly 40. That is, the first contact 28 and the second contact 30, as well as portions of the first stem assembly 26 and the second stem assembly 32, are disposed within a vacuum housing 42. Further, one or both of the first contact 28 and the second contact 30 are operatively coupled to the operating mechanism 17. The operating mechanism 17 is structured to move the first contact 28 and the second contact 30 between a first configuration, wherein the first contact 28 is spaced from, and is not in electrical communication with, the second contact 30 and a second configuration, wherein the first contact 28 is directly coupled to, and is in electrical communication with, the second contact 30.

Figure 2:
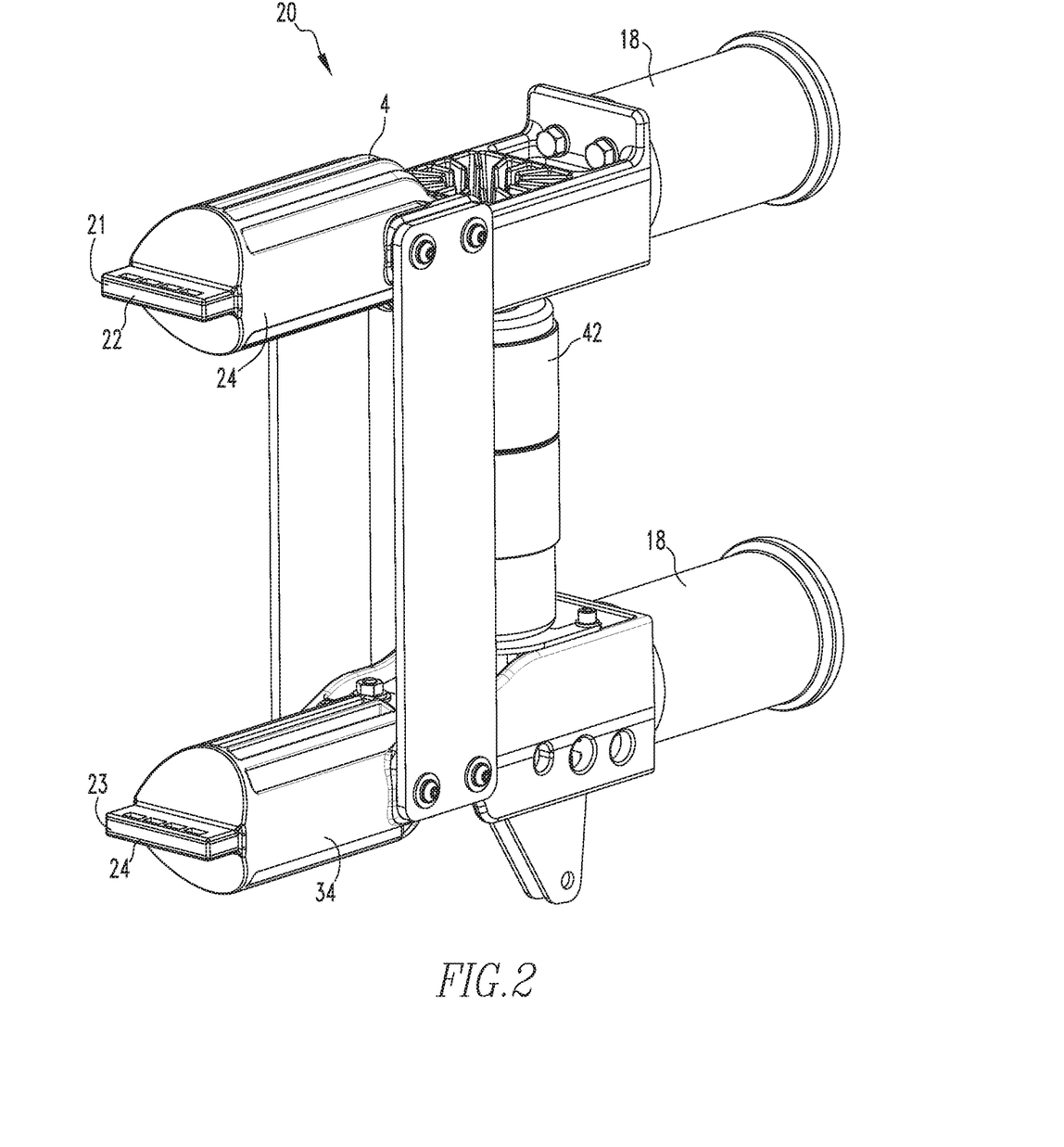
FIG. 2 is an isometric view of a conductor assembly.
Figure 3:
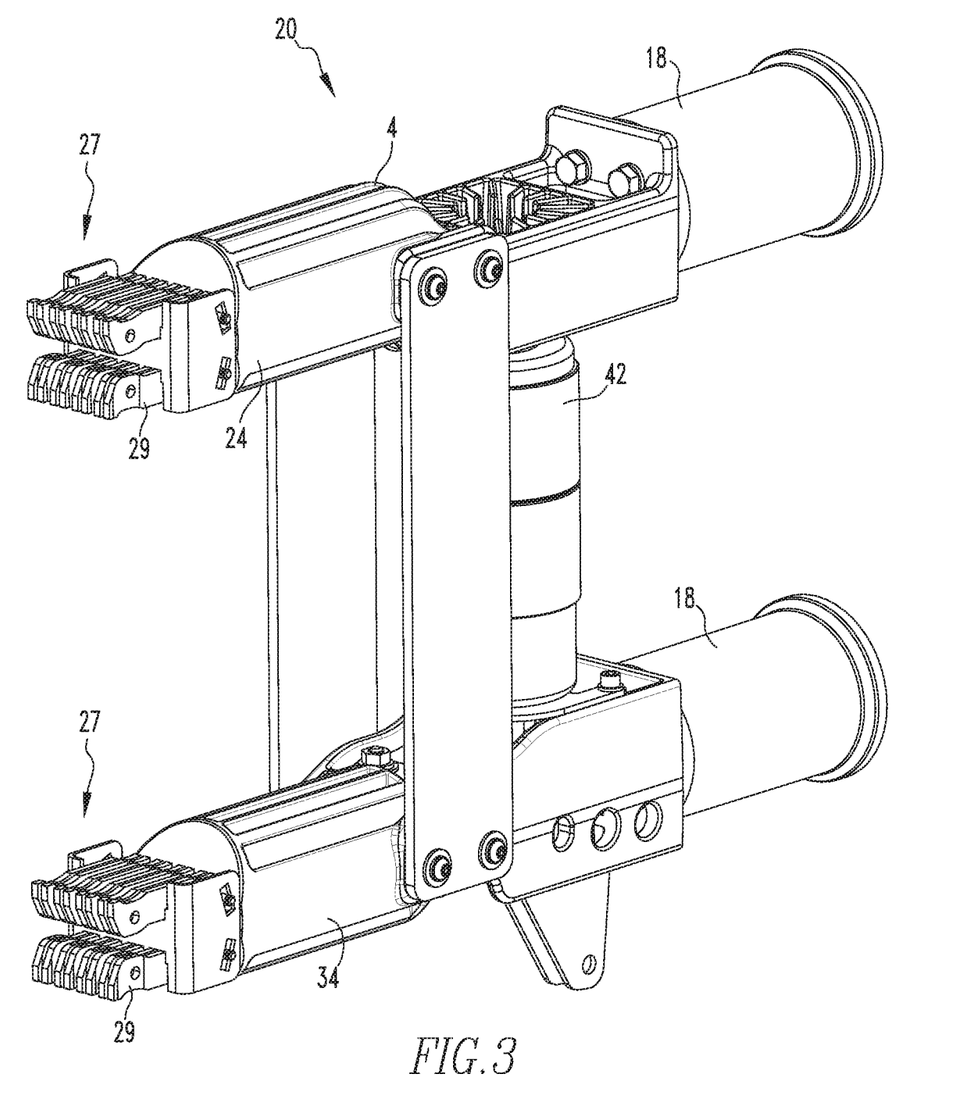
FIG. 3 is another isometric view of a conductor assembly.
Figure 4:
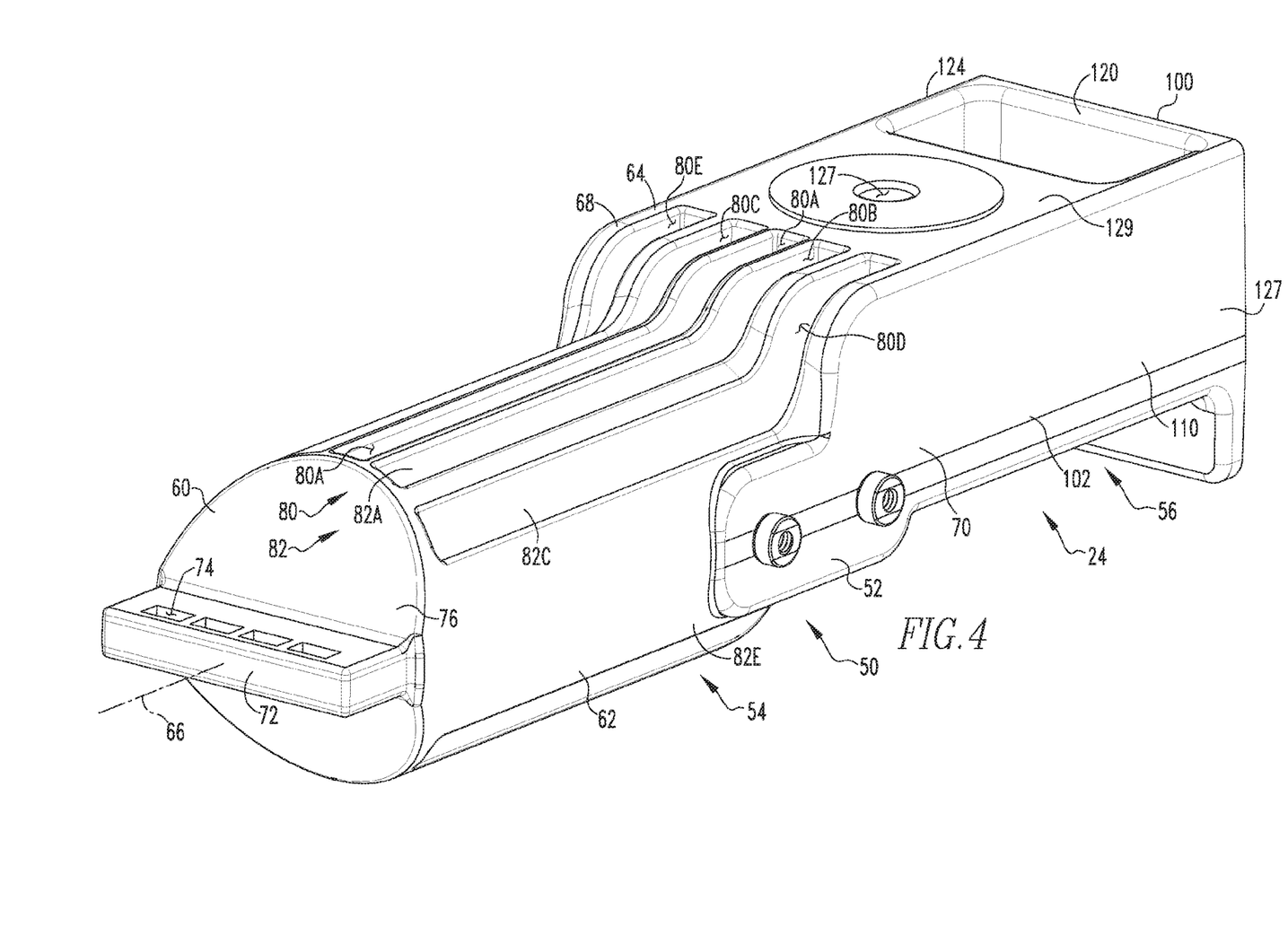
FIG. 4 is an isometric view of a first embodiment of a conductive member.
Figure 5:
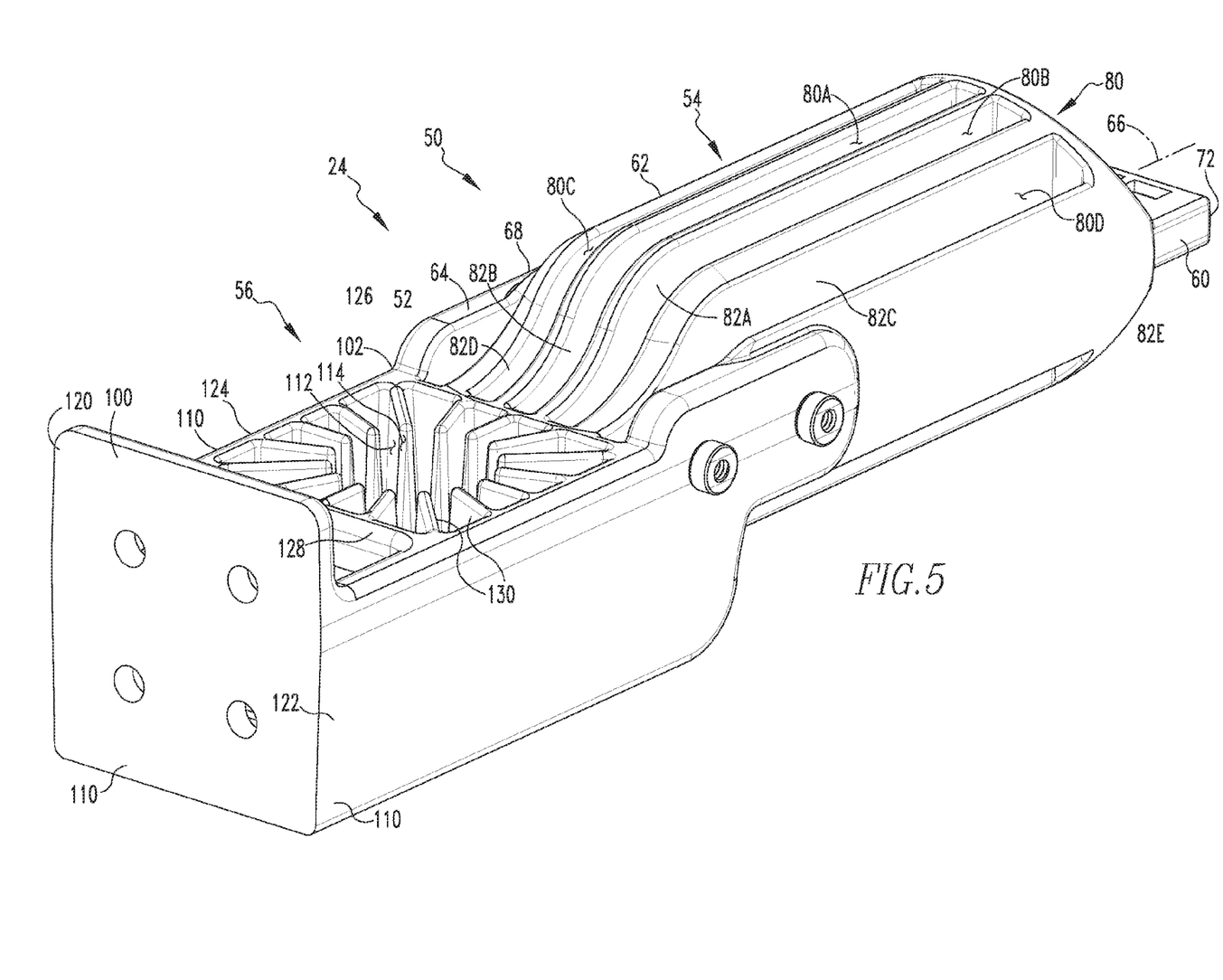
FIG. 5 is another isometric view of a first embodiment of a conductive member.

As shown in FIGS. 2 and 3, the first terminal 22 is structured to be, and is, coupled to a line 1 (FIG. 1) and includes a fixed coupling 21. The second terminal 36 is structured to be, and is, coupled to a load 2 (FIG. 1) and includes a fixed coupling 23. In an exemplary embodiment, the first terminal coupling 21 and the second terminal coupling 23 are in a "fixed" location. That is, as used herein in reference to electrical terminal couplings 21, 23, "fixed" means that during operation of the vacuum circuit breaker 10, the conductive couplings 21, 23 of the terminals 22, 36 do not move relative to other elements of the vacuum circuit breaker 10. Further, as is known, the first and second terminals 22, 24 include, in an exemplary embodiment, a coupling device 27 such as, but not limited to, opposed sets of flexible "fingers" 29. The opposed sets of flexible fingers 29 are also known as "finger clusters."

FIGS. 4-8 show the primary first conductor 24 and FIGS. 9-13 show the primary second conductor 34. The primary first conductor 24 and primary second conductor 34 each include a conductive member 50, 150. In an exemplary embodiment, each conductive member 50, 150 for both the primary first conductor 24 and primary second conductor 34 has similarities but with the exceptions noted below. That is, in an exemplary embodiment, each conductive member 50, 150 includes a unitary, elongated body 52, 152 having an elongated transfer portion 54, 154 and a coupling portion 56, 156. In an exemplary embodiment, each conductive member body transfer portion 54, 154 is substantially similar and only one will be described. The following description is for the primary first conductor conductive member body 52. It is understood that the primary second conductor conductive member body 152 includes similar elements which may be identified by similar names and having reference numbers +100. That is, as used above, the primary first conductor conductive member body 52 includes a primary first conductor conductive member body transfer portion 54, thus, the primary second conductor conductive member body 152 includes a primary second conductor conductive member body transfer portion 154.

In an exemplary embodiment, the primary first conductor conductive member body transfer portion 54 has an electro-thermally efficient contour. As used herein, "contour" means a cross-sectional shape. As used herein, an "electro-thermally efficient contour" means a contour of a conductive member, or a portion of a conductive member, that is both an "electrically efficient contour" and a "thermally efficient contour." As used herein, an "electrically efficient contour" means a conductive member, or a portion of a conductive member, has a contour that distributes current generally evenly across a cross-sectional area of the conductive member, or a portion of a conductive member. As used herein, a "thermally efficient contour" means a conductive member, or a portion of a conductive member, has a contour that is structured to transfer heat via convection. Further, "structured to transfer heat via convection" means that the contour is structured to transfer more heat via convection than a substantially solid contour with a similar peripheral shape; thus, a solid conductive member, such as, but not limited to a cylindrical or planar conductive member is not, as used herein, "structured to transfer heat via convection." That is, the primary first conductor conductive member body transfer portion 54 and the primary second conductor conductive member body transfer portion 154 in the exemplary embodiment shown have a peripheral contour that is generally circular. Thus, a substantially solid contour with a similar peripheral shape to the exemplary embodiment shown would be a solid cylinder. Further, a conductive member that defines a substantially enclosed space, such as, but not limited to, a hollow cylinder, is not, as used herein, "structured to transfer heat via convection." In another exemplary embodiment, the primary first conductor conductive member body transfer portion 54 has an electrically efficient contour. In another exemplary embodiment, the primary first conductor conductive member body transfer portion 54 has a thermally efficient contour.

In an exemplary embodiment, the primary first conductor conductive member body transfer portion 54 (hereinafter "body transfer portion" 54) includes a distal, first end 60, an elongated, generally cylindrical medial portion 62, and a proximal, second end 64. As shown, and in an exemplary embodiment, the first conductor conductive member body transfer portion medial portion 62 has a greater length than the primary first conductor conductive member body transfer portion first and second ends 60, 64; thus, the body transfer portion 54 is also generally cylindrical. The primary first conductor conductive member body transfer portion 54 also includes a centerline 66, an outer, first lateral side 68 and an outer, second lateral side 70. The primary first conductor conductive member body transfer portion centerline 66 (hereinafter "transfer portion centerline" 66) extends along the longitudinal axis of the elongated primary first conductor conductive member body transfer portion 54. The primary first conductor conductive member body transfer portion first lateral side 68 and primary first conductor conductive member body transfer portion second lateral side 70 (hereinafter "transfer portion first lateral side" 68 and "transfer portion second lateral side" 70, respectively) are the sides of the primary first conductor conductive member body transfer portion 54 disposed in a generally horizontal plane which also extends through the transfer portion centerline 66.

In an exemplary embodiment, the primary first conductor conductive member body transfer portion first end 60 (hereinafter "transfer portion first end" 60) defines the first terminal 22. In an exemplary embodiment, the first terminal 22 is a body 72 shaped as an elongated, parallelepiped. The first terminal body 72 is unitary with the primary first conductor conductive member body transfer portion 54. The longitudinal axis of the first terminal body 72 generally extends between the transfer portion first lateral side 68 and the transfer portion second lateral side 70. As shown, in an exemplary embodiment, the first terminal body 72 defines a number of generally vertical passages 74. The transfer portion first end 60, in an exemplary embodiment, also includes a tapered portion 76 that transitions between the generally cylindrical primary first conductor conductive member body transfer portion medial portion 62 and the first terminal body 72.

The primary first conductor conductive member body transfer portion medial portion 62 (hereinafter "transfer portion medial portion" 62) includes a number of slots 80 extending therethrough. In an exemplary embodiment, each slot 80 extends generally vertically through the transfer portion medial portion 62, i.e., through the body transfer portion 54. In this configuration, the slots 80 define a number of fins 82. As used herein, a "fin" is a generally thin member having a large surface area relative to the volume. Further, a "fin" may include surface features, such as, but not limited to, openings or grooves. Also, a "fin" may include elements having a curved cross-section. As used herein, a "planar fin" is a "fin" that is generally planar. A "planar fin" may also include surface features such as, but not limited to, openings, grooves, or an arcuate surface. For example, a corrugated sheet has grooves and peaks but is, overall, a planar member. Similarly, the outermost fins 82E, 82F (discussed below) have an arcuate surface but are still, as used herein, "planar fins." In an exemplary embodiment, as shown, each fin 82 is a planar fin 83.

Generally, the number of fins 82 reduce the internal volume of material that defines the transfer portion medial portion 62, i.e., the body transfer portion 54. As the transfer portion medial portion 62, i.e., the body transfer portion 54, has a reduced internal volume, current is not concentrated only at the surface of the transfer portion medial portion 62, i.e., the body transfer portion 54. Stated alternately, the transfer portion medial portion 62, i.e., the body transfer portion 54, distributes current generally evenly across a cross-sectional area of the conductive member body 52. That is, the slots 80, which also means the fins 82 defined thereby, solve the problem stated above and create an electrically efficient contour for the transfer portion medial portion 62, i.e., the body transfer portion 54. Further, in an exemplary embodiment, the surfaces that define the slots 80 extend generally vertically. In this configuration, the slots 80/fins 82 allow for heat dissipation via convection. That is, the contour of the transfer portion medial portion 62, i.e., the body transfer portion 54, as described above also defines a thermally efficient contour. Thus, as the transfer portion medial portion 62, i.e., the body transfer portion 54 is both an electrically efficient contour and a thermally efficient contour, the transfer portion medial portion 62, i.e., the body transfer portion 54 is an electro-thermally efficient contour. Thus, the configuration of the transfer portion medial portion 62, i.e., the body transfer portion 54, described above solves the problems stated above.

In an exemplary embodiment, the fins 82 are spaced, that is the slots 80 have a lateral width, of between about 0.125 and 0.5 inch, or about 0.25 inch. This spacing allows a sufficient amount of air flow through the slots 80 to provide an effective amount of heat transfer. Accordingly, fins 82 that are spaced, i.e., when slots 80 with a lateral width of, between about 0.125 and 0.5 inch have, as used herein, an "effective spacing for heat transfer." Further, fins 82 that are spaced, i.e., when slots 80 with a lateral width of, about 0.25 inch have, as used herein, an "efficient spacing for heat transfer." In an exemplary embodiment, each fin 82 is spaced relative to another fin so as to have either an effective spacing for heat transfer, or, an efficient spacing for heat transfer.

In another embodiment, not shown, the surfaces that define the slots 80 extend at an angle to a generally vertically plane. Thus, the slots 80 may be wider at the top and narrow at the bottom, or, narrower at the top and wider at the bottom. As used herein, fins 82 with angled surfaces are still "generally planar" and are planar fins 83.

In an exemplary embodiment, there are five slots 80 which define six fins 82. In this configuration, and in an exemplary embodiment, there is a center slot 80A which is disposed along the transfer portion centerline 66. The center slot 80A has the greatest depth as it extends from the top of the transfer portion medial portion 62, i.e., the body transfer portion 54, to the bottom of the transfer portion medial portion 62, i.e., the body transfer portion 54. On either side of the center slot 80A there is a first inner slot 80B and a second inner slot 80C. On the outer side of the first inner slot 80B and the second inner slot 80C, i.e., further from the transfer portion centerline 66, are a first outer slot 80D and a second outer slot 80E.

In this configuration, the five slots 80 define six fins 82 in the transfer portion medial portion 62, i.e., the body transfer portion 54. That is, as shown, there are two innermost fins 82A, 82B, two inner fins 82C, 82D, and two outer fins 82E, 82F. The two innermost fins 82A, 82B and the two inner fins 82C, 82D, collectively the "number of inner fins" 82A, 82B, 82C, 82D, are each disposed between adjacent slots 80A, 80B, 80C, 80D, and 80E. The two outer fins 82E, 82F are disposed between a slot 80D, 80E and the adjacent outer lateral side of the transfer portion medial portion 62, i.e., the body transfer portion 54.

In one embodiment, not shown, the fins 82 each have generally the same thickness. As used herein, the "thickness" of a fin is measured in a lateral direction, i.e., in a direction normal to surfaces defining the transfer portion first lateral side 68 and the transfer portion second lateral side 70. In the embodiment shown, each fin 82 thickness increases further a fin 82 is from the transfer portion centerline 66. That is, as shown, the two innermost fins 82A, 82B are the thinnest fins 82, the two inner fins 82C, 82D are thicker than the innermost fins 82A, 82B, but are more narrow than the two outer fins 82E, 82F. Thus, the two outer fins 82E, 82F are the thickest fins 82. Stated alternately, there are a number of sets 90, 92, 94 (as shown) of fins 82. For example, as shown, the innermost fins 82A, 82B are a first set 90 of fins 82, the two inner fins 82C, 82D are a second set 92 of fins 82, and the two outer fins 82E, 82F are a third set 94 of fins 82. In this embodiment, each fin 82 in a set 90, 92, 94 of fins 82 has substantially the same thickness as other fins 82 in the same set 90, 92, 94. It is noted that the thickness of any given fin 82 is determined by the lateral width, i.e., thickness, and/or spacing between the slots 80.

The primary first conductor conductive member body transfer portion second end 64 (hereinafter "transfer portion second end" 64) is, in an exemplary embodiment, unitary with the primary first conductor conductive member body coupling portion 56 (hereinafter "body coupling portion" 56). The body coupling portion 56 includes a distal, first end 100 and a proximal, second end 102. Further, the body coupling portion 56, in an exemplary embodiment, is defined by a number of generally planar members 110 forming an enclosed space 112. That is, as used herein, "enclosed" means that the body coupling portion enclosed space 112 is enclosed on at least four sides. In an exemplary embodiment, the planar members 110 include a distal member 120, a first lateral side member 122, a second lateral side member 124, and a proximal member 126. The proximal member 126 is, as shown in an exemplary embodiment, unitary with the transfer portion second end 64. Further, in an exemplary embodiment, the first lateral side member 122 and the second lateral side member 124 extend over the transfer portion second end 64. That is, the first lateral side member 122 and the second lateral side member 124 have a length sufficient to extend past the proximal member 126.

Each planar member 110 includes rounded edges and corners. That is, in an exemplary embodiment, each exposed edge (as used herein, an "edge" means where two surfaces of the planar member 110 meet) is rounded having a radius of between about 0.03 inch and 0.25 inch, or about 0.12 inch. Further, any exposed corner (as used herein, a "corner" is any feature along an edge that is not substantially straight) is rounded having a radius of between about 0.03 inch and 0.25 inch or about 0.12 inch. As used herein, "exposed" means a surface not within the body coupling portion enclosed space 112 or the outer surface of the distal member 120 (which is coupled to a stand-off support 18). In this configuration, the planar members 110 reduce the chance of an arc forming at either an edge or corner of the conductive member 50.

Figure 6:
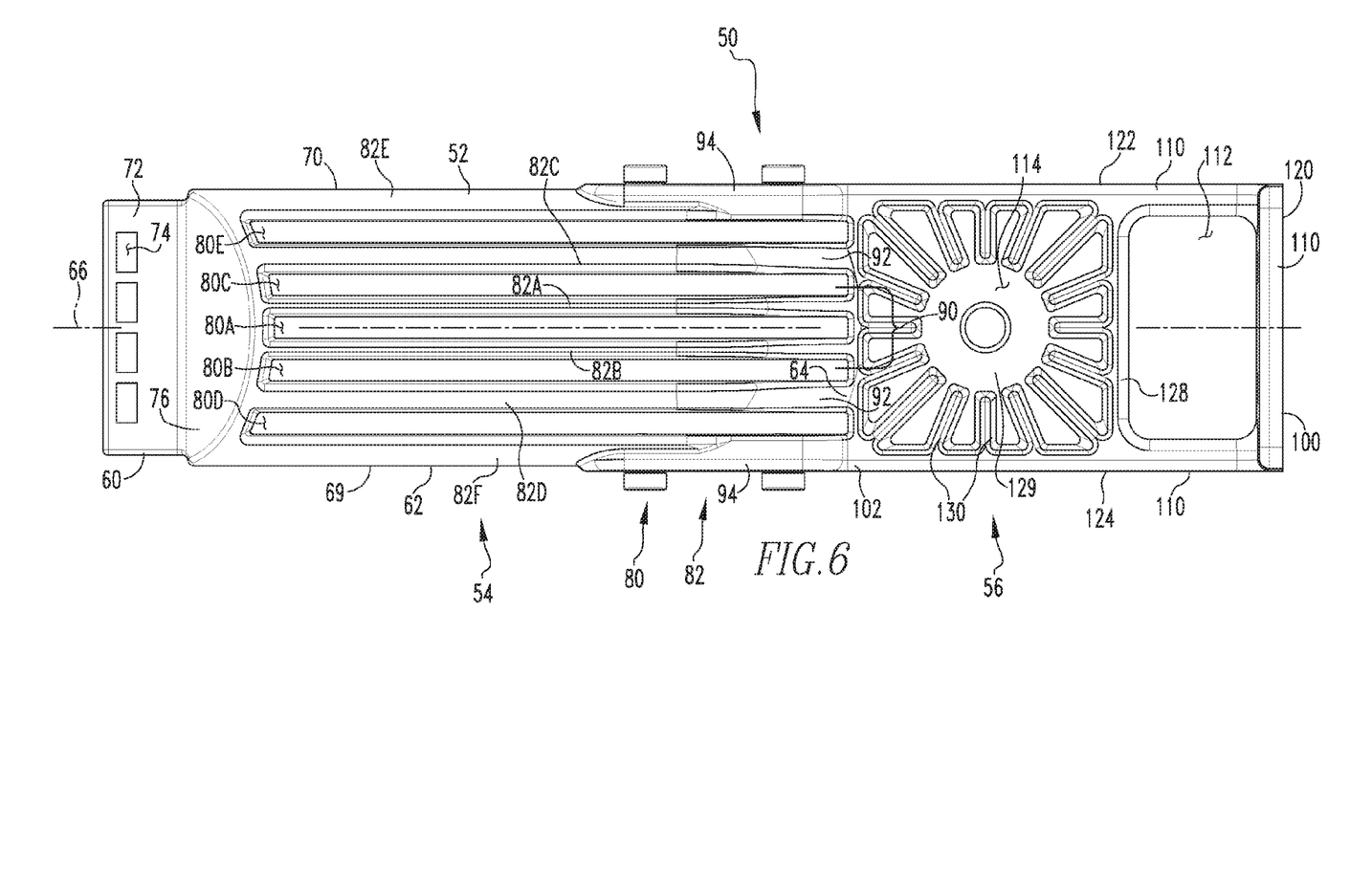
FIG. 6 is a top view of a first embodiment of a conductive member.
Figure 7:
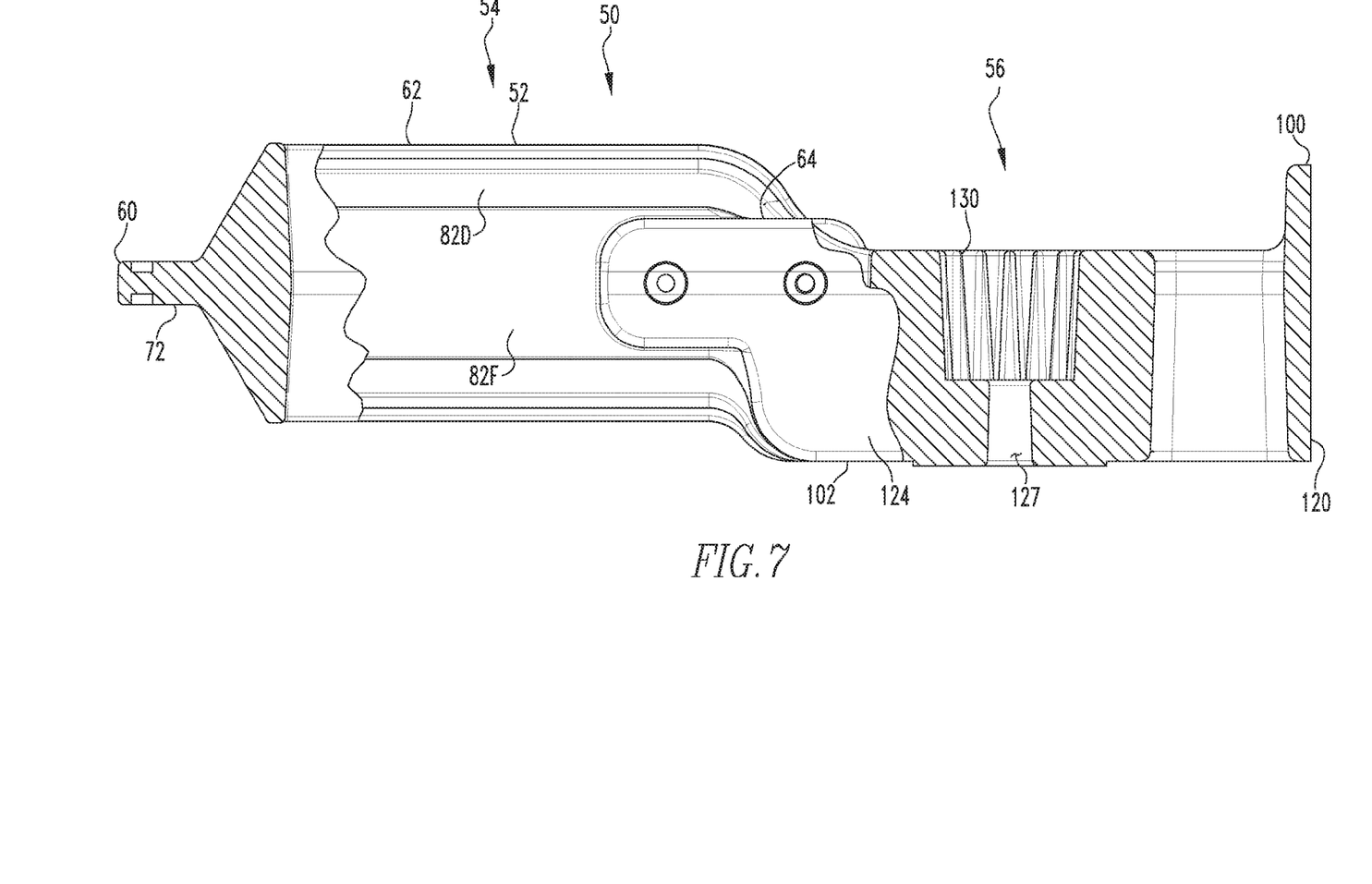
FIG. 7 is a side, partial cross-sectional view of a first embodiment of a conductive member.
Figure 8:
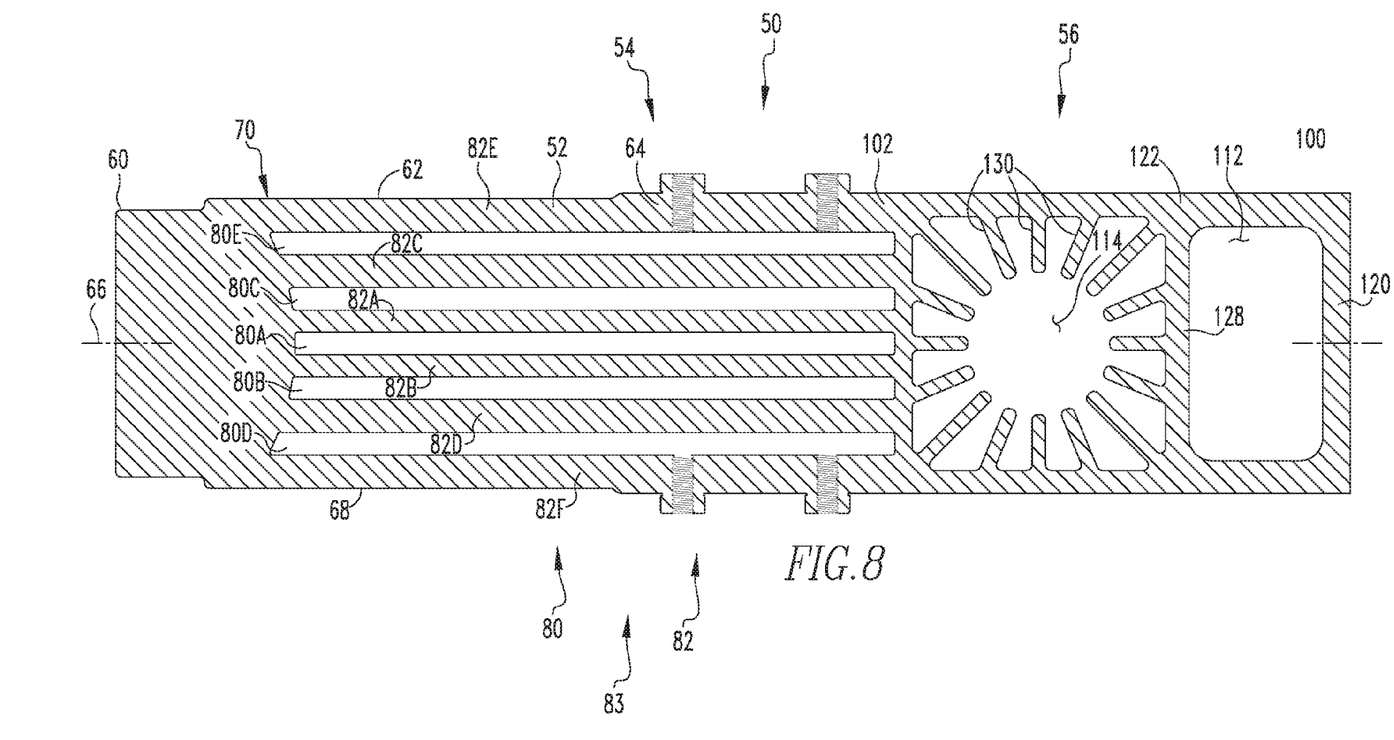
FIG. 8 is a top, cross-sectional view of a first embodiment of a conductive member.
Figure 9:
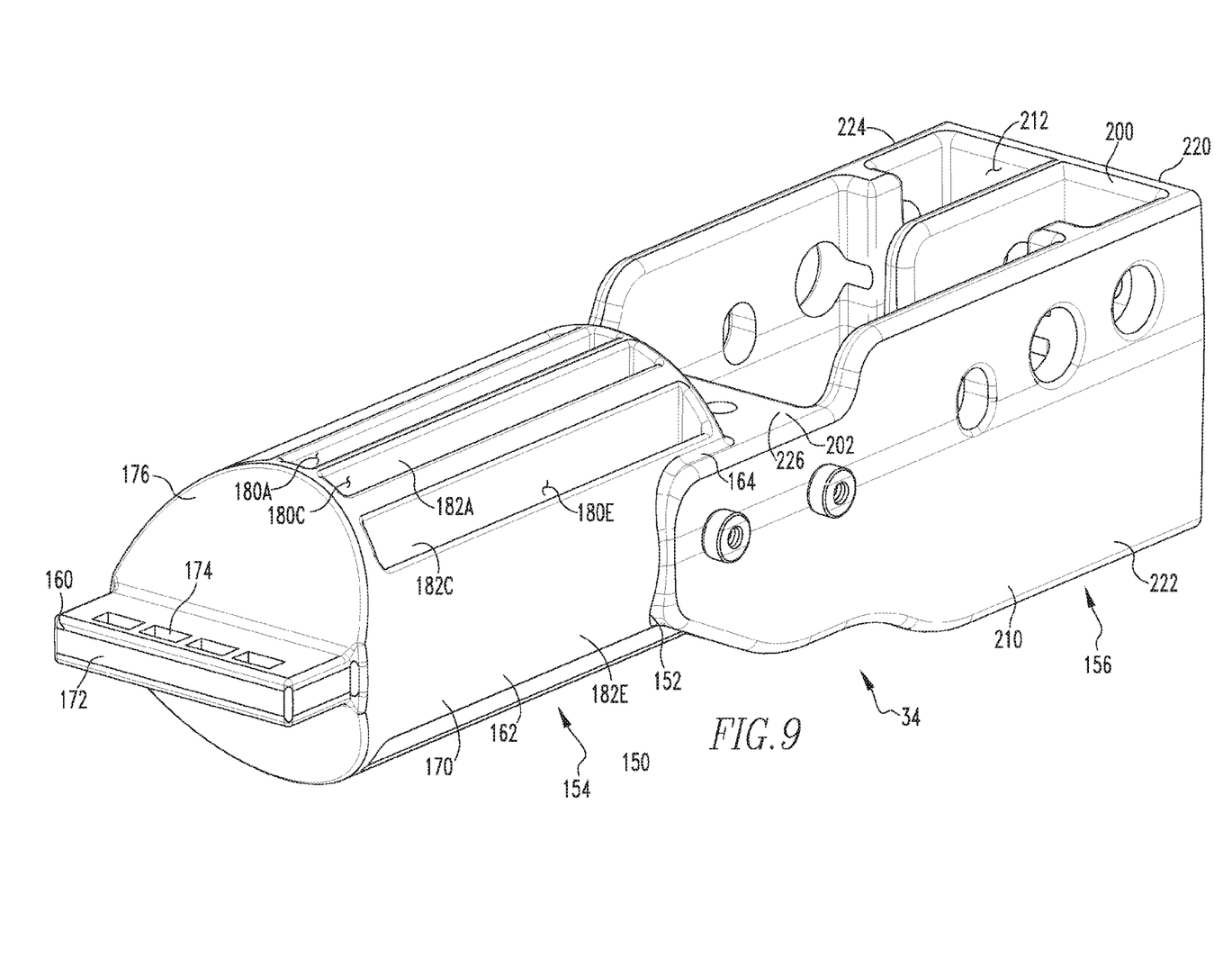
FIG. 9 is an isometric view of a second embodiment of a conductive member.
Figure 10:
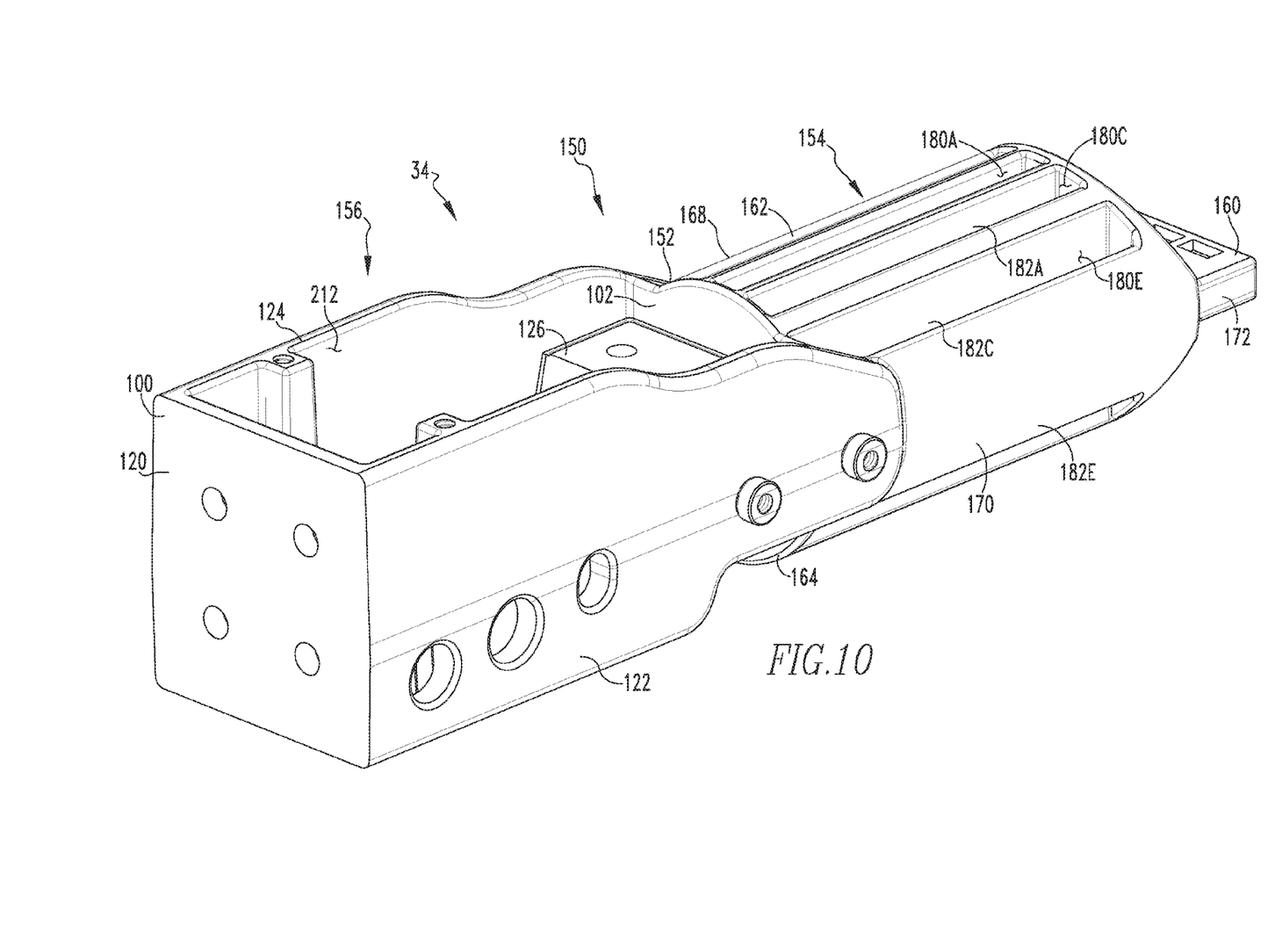
FIG. 10 is another isometric view of a second embodiment of a conductive member.
Figure 11:
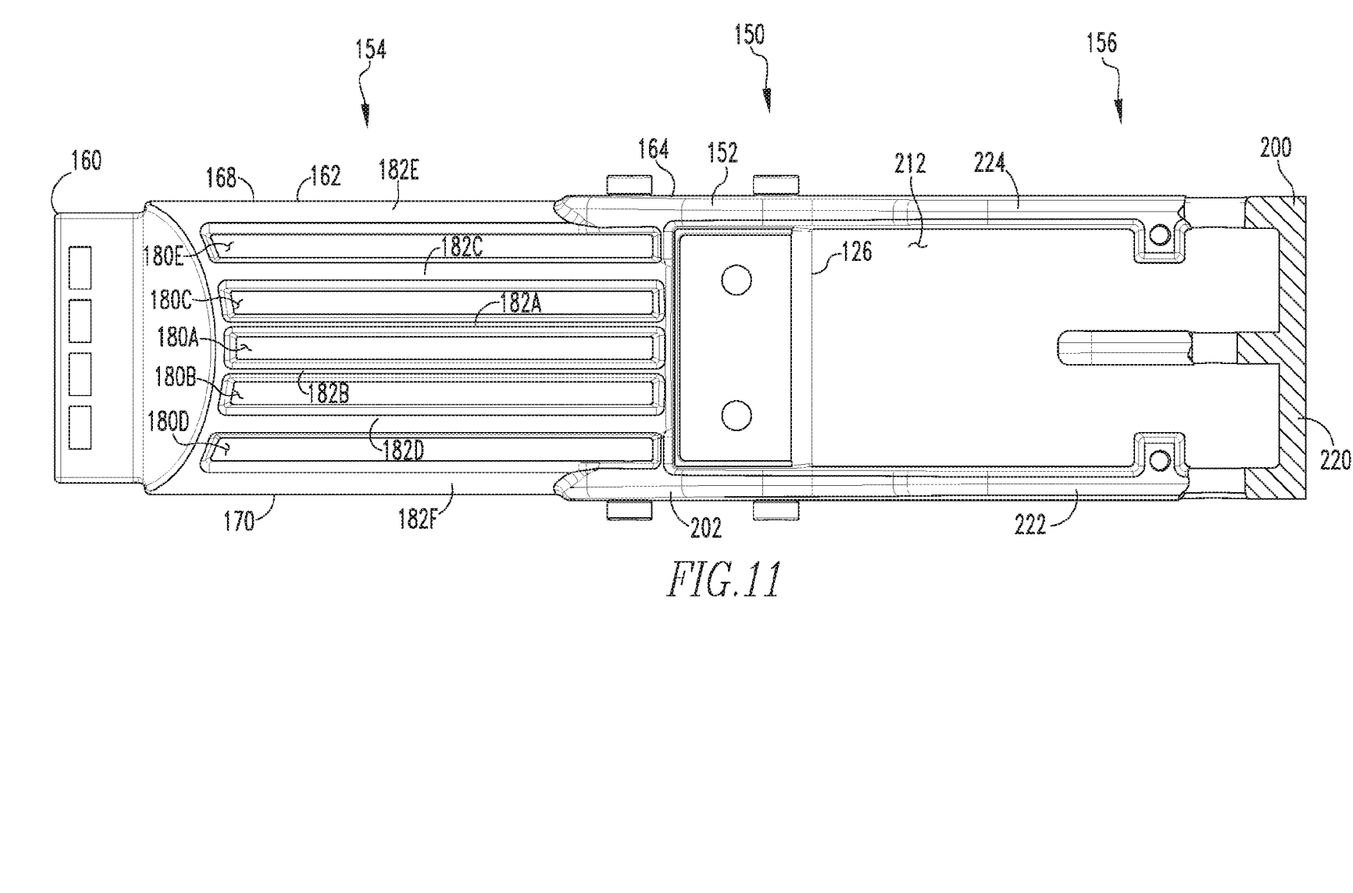
FIG. 11 is a top view of a second embodiment of a conductive member.
Figure 12:
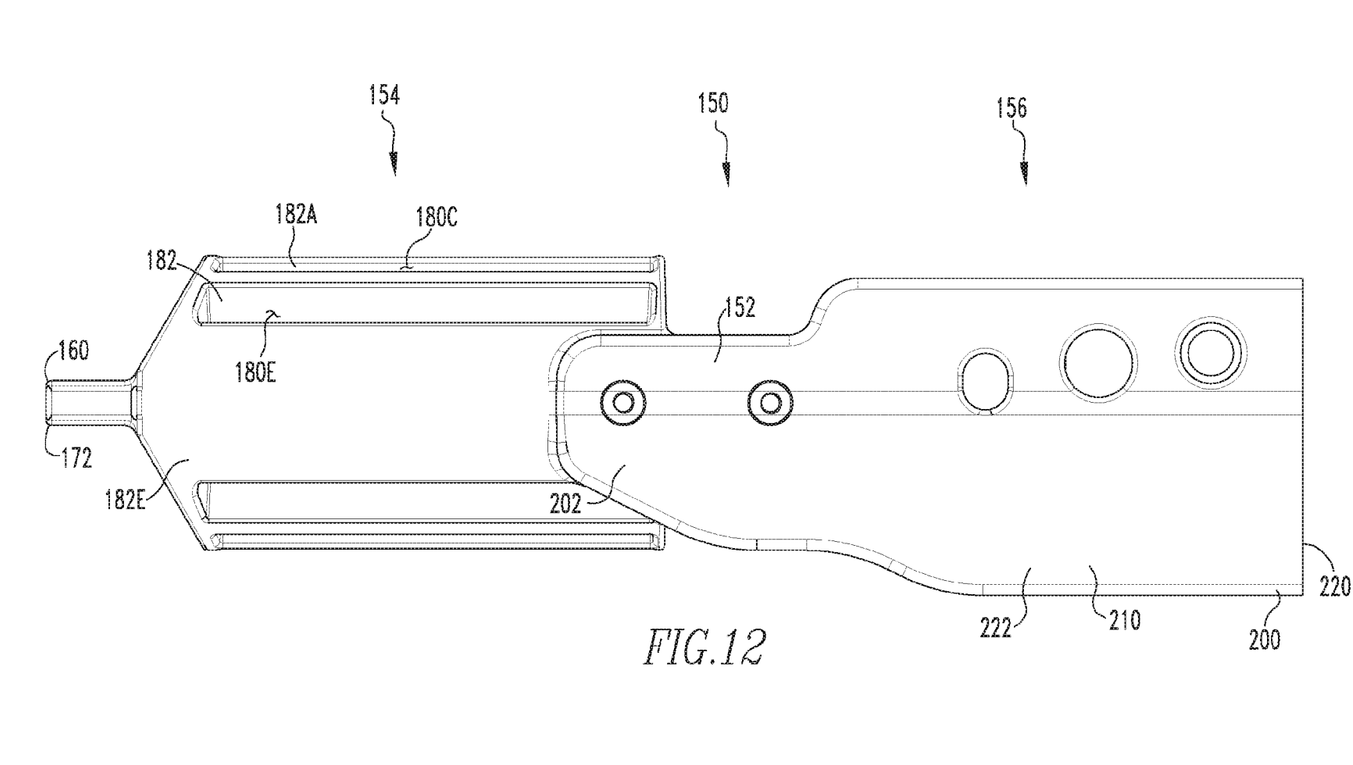
FIG. 12 is a side view of a second embodiment of a conductive member.
Figure 13:
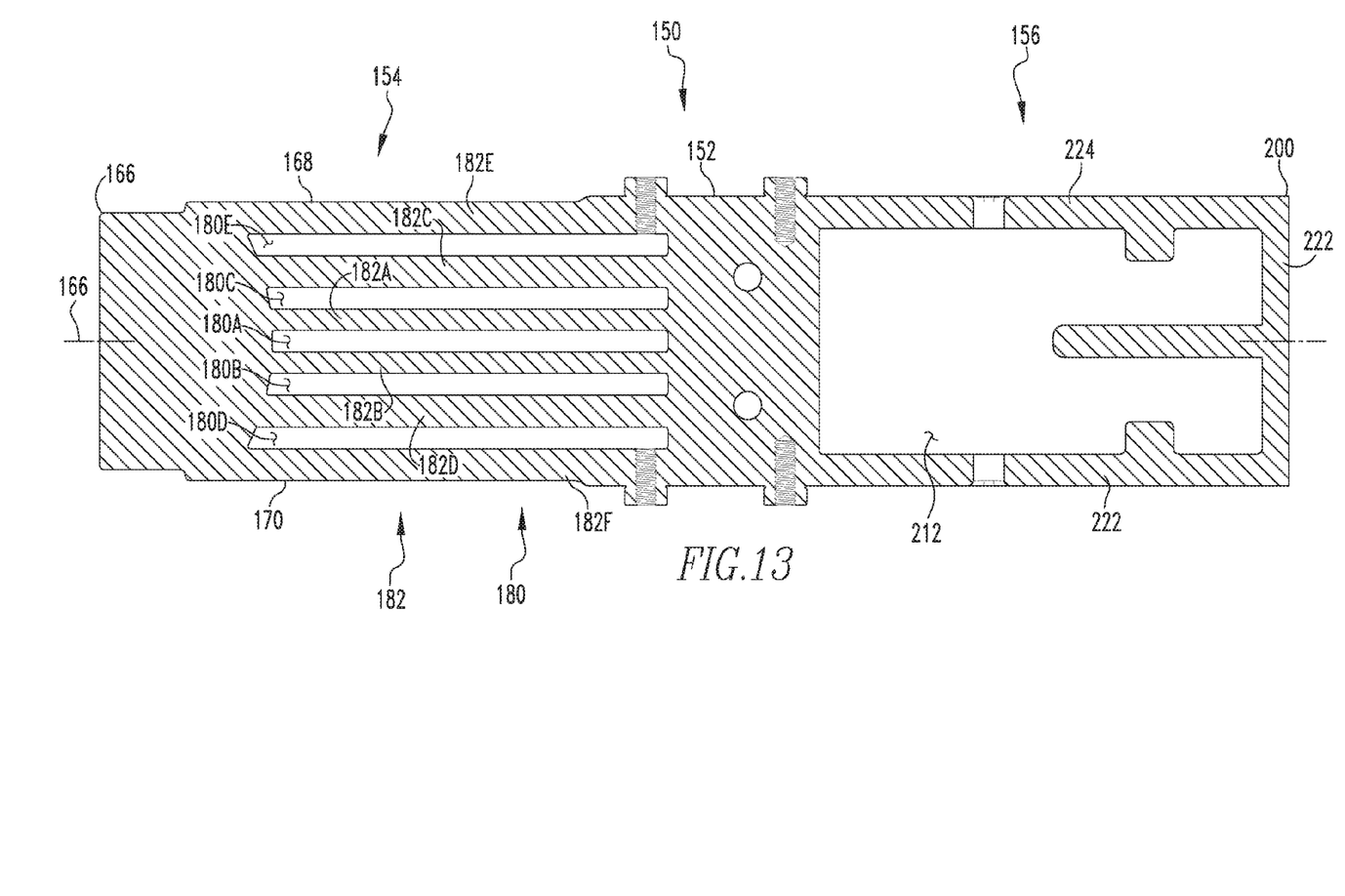
FIG. 13 is a top, cross-sectional view of a second embodiment of a conductive member.

The elements identified above are common to both the primary first conductor conductive member body 52 and primary second conductor conductive member body 152. The following description shall address elements found only on the primary first conductor conductive member body 52. As shown in FIG. 6, and in an exemplary embodiment, the body coupling portion 56 includes an inner planar member 128, a bottom member 129 and a number of fins 130. The inner planar member 128 extends between the first lateral side member 122 and the second lateral side member 124 and defines a generally square enclosed space 114 within the enclosed space 112. The bottom member 129 generally extends over and substantially closes the generally square enclosed space 114 at the bottom. The bottom member 129 defines a passage 127 structured to allow coupling components (not shown) to pass therethrough. That is, for example, coupling components structured to couple the primary first conductor conductive member body 52 to the associated stand-off supports 18 pass through passage 127.

The body coupling portion fins 130 extend into the body coupling portion enclosed space 112 from the inner surface of the planar members 110 defining the generally square enclosed space 114. In an exemplary embodiment, the body coupling portion fins 130 are disposed in a radial pattern. As used herein, a "radial pattern" for fins means that the planes of multiple fins passes through a common axis. In an exemplary embodiment, the body coupling portion fins 130 are tapered; that is, the space defined between body coupling portion fins 130 is wider at the open, top end of the generally square enclosed space 114 and narrower at the closed, bottom end of the generally square enclosed space 114.

In the primary second conductor conductive member 150, the body coupling portion enclosed space 212 is structured to be operatively coupled to the operating mechanism 17. That is, the body coupling portion enclosed space 212 is substantially hollow and is structured to allow elements of the operating mechanism 17 to pass therethrough. For example, an extension (not numbered) extends into the body coupling portion enclosed space 212; the extension includes a passage to which a bell crank (not numbered) is rotatably coupled.

In an exemplary embodiment, the primary first conductor conductive member body 52 and primary second conductor conductive member body 152 are made from aluminum. Use of aluminum helps with the distribution of current and enhances the electrically efficiency of the contour described above. That is, use of aluminum helps solve the problems stated above.

Generally, the primary first conductor 24 is coupled to, and in electrical communication with, the first stem assembly 26. The first stem assembly 26 is coupled to, and in electrical communication with, the first contact 28. In an exemplary embodiment, the first terminal 22, primary first conductor 24, first stem assembly 26, and first contact 28 are substantially fixed in place relative to the low voltage portion 12. The second contact 30 is coupled to, and in electrical communication with, the second stem assembly 32. The second stem assembly 32 is coupled to, and in electrical communication with, the primary second conductor 34. The second contact 30 and a portion of the second stem assembly 32 are movably disposed in the vacuum housing 42. As is known, the second stem assembly 32 includes a bellows (not shown) that allows the second contact 30 and a portion of the second stem assembly 32 to move. The operating mechanism 17 is operatively coupled to the second contact 30 and a portion of the second stem assembly 32. As noted above, the operating mechanism 17 is structured to move the first contact 28 and the second contact 30 between a first configuration, wherein the first contact 28 is spaced from, and is not in electrical communication with, the second contact 30 and a second configuration, wherein the first contact 28 is directly coupled to, and is in electrical communication with, the second contact 30.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A conductive member for a circuit breaker high voltage portion conductor assembly, said conductive member comprising:
   a body;
   said body includes a transfer portion and a coupling portion;
   wherein said body transfer portion has an electrically efficient contour;
   said body transfer portion is substantially cylindrical;
   said body coupling portion includes a number of generally planar members defining an enclosed space; and
   said body coupling portion planar members including rounded edges.

2. The conductive member of claim 1 wherein:
   said body coupling portion includes a number of fins; and
   said body coupling portion fins disposed in said body coupling portion enclosed space.

3. The conductive member of claim 2 wherein said body coupling portion fins are disposed in a generally radial pattern.

4. The conductive member of claim 1 wherein said body is an aluminum body.

5. A vacuum circuit breaker comprising:
   a low voltage portion, and high voltage portion;
   said low voltage portion including an operating mechanism;
   said low voltage portion operatively coupled to said high voltage portion;
   said high voltage portion including a conductor assembly and a vacuum interrupter assembly;
   said conductor assembly including a first terminal, a primary first conductor, a primary second conductor, and a second terminal;
   said vacuum interrupter assembly including a first stem assembly, a first contact, a second contact, a second stem assembly, and a vacuum housing;
   said first contact coupled to, and in electrical communication with, said first stem assembly;
   said first stem assembly coupled to, and in electrical communication with, said first conductor;
   said second contact coupled to, and in electrical communication with, said second stem assembly;
   said second stem assembly coupled to, and in electrical communication with, said second conductor;
   said first contact disposed in said vacuum housing;
   said second contact movably disposed in said vacuum housing;
   said operating mechanism operatively coupled to said second contact, wherein said second contact is structured to move between a first position, wherein said second contact assembly contact member is not directly coupled to said first contact assembly contact member, and a second position, wherein said second contact assembly contact member is coupled to, and in electrical communication with, said first contact assembly contact member;
   wherein one of said primary first conductor or said primary second conductor includes a body;
   said body includes a transfer portion and a coupling portion;
   wherein said body transfer portion has an electrically efficient contour;
   said body transfer portion is substantially cylindrical;
   said body coupling portion includes a number of generally planar members defining an enclosed space; and
   said body coupling portion planar members including rounded edges.

6. The vacuum circuit breaker of claim 5 wherein:
   said body coupling portion includes a number of fins; and
   said body coupling portion fins disposed in said body coupling portion enclosed space.

7. The vacuum circuit breaker of claim 6 wherein said body coupling portion fins are disposed in a generally radial pattern.

8. The vacuum circuit breaker of claim 5 wherein said body is an aluminum body.

* * * * *